Aug. 23, 1932.  E. C. BIXBY  1,873,531
TIMER MECHANISM
Filed July 11, 1931  2 Sheets-Sheet 2
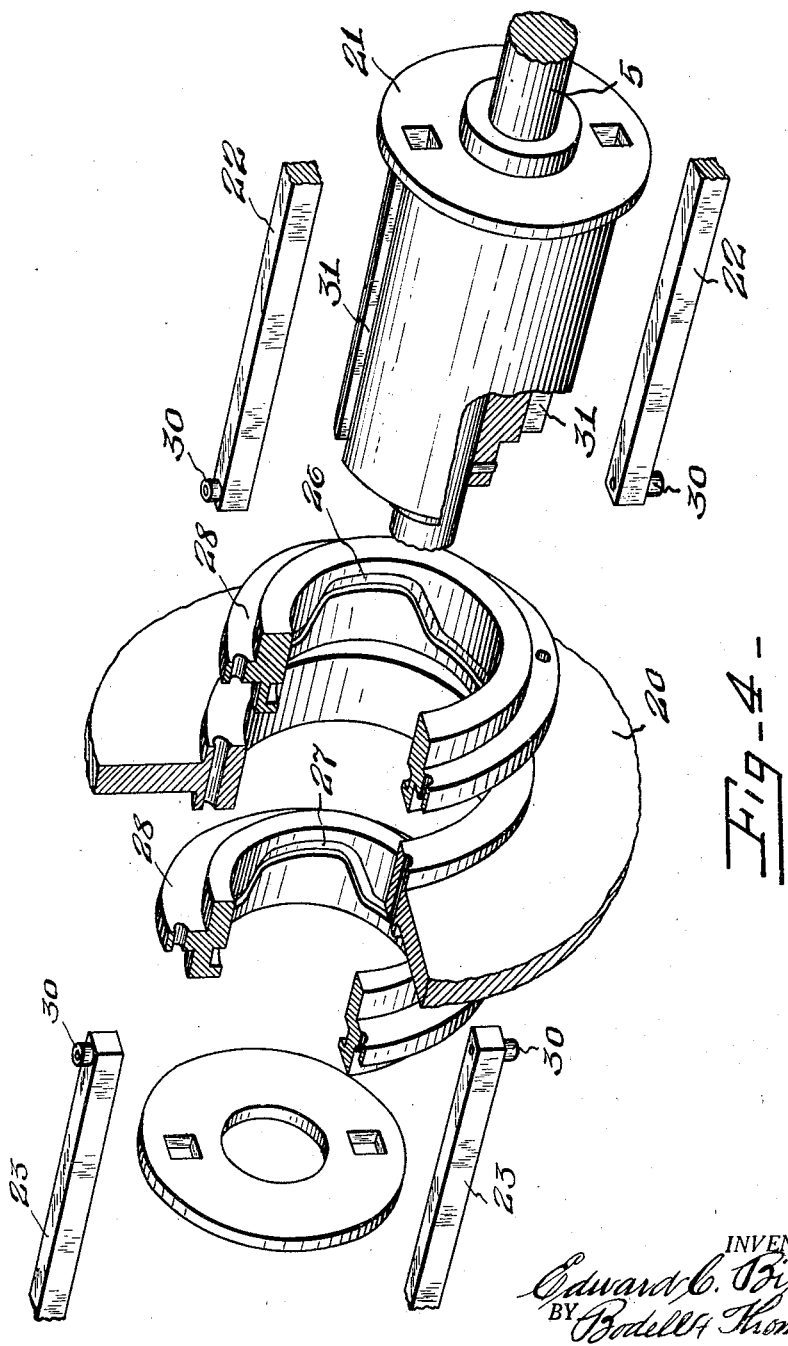
INVENTOR.
Edward C. Bixby
BY Bodell & Thompson
ATTORNEYS.

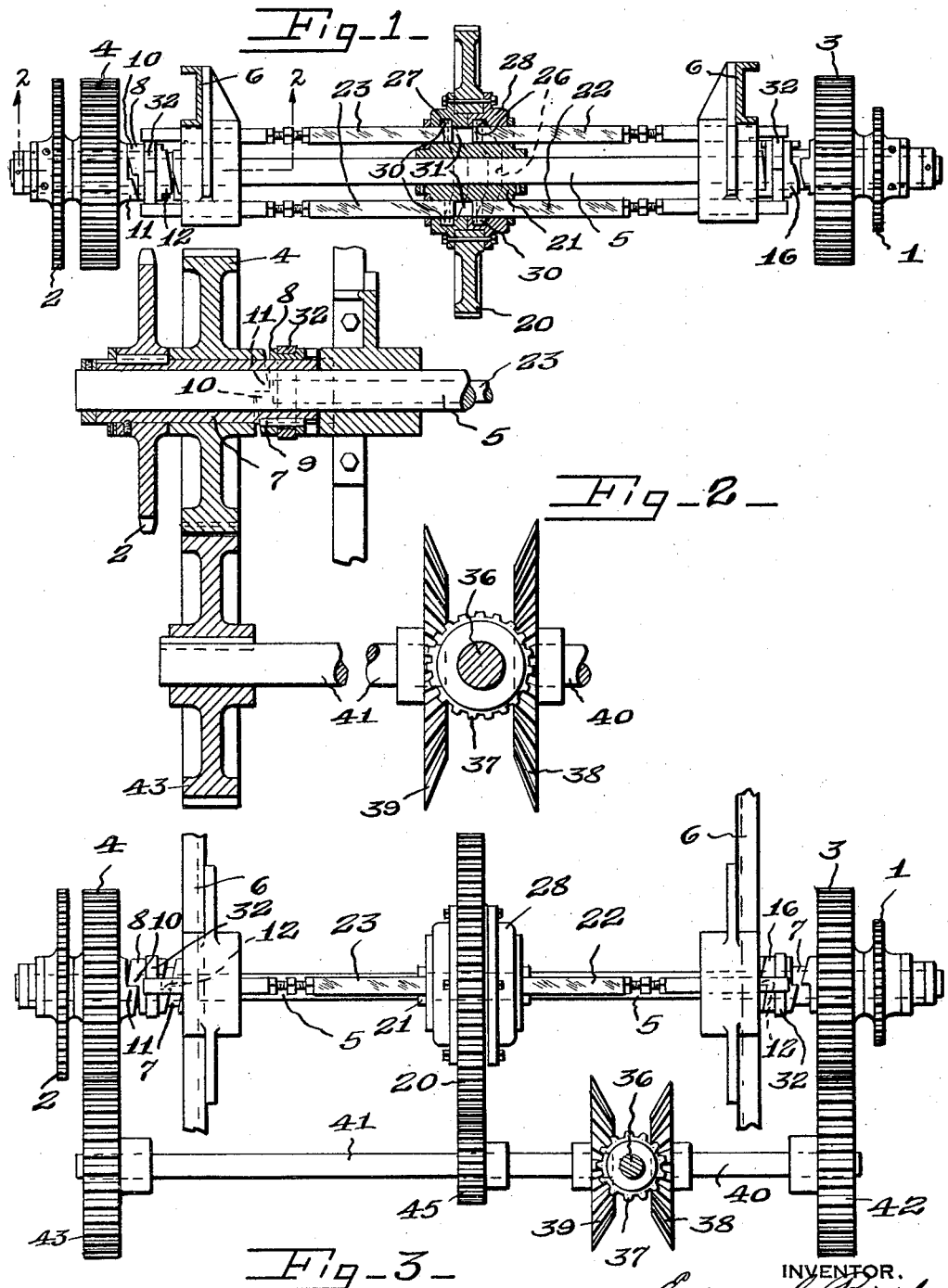

Patented Aug. 23, 1932

1,873,531

UNITED STATES PATENT OFFICE

EDWARD C. BIXBY, OF SALINA, NEW YORK

TIMER MECHANISM

Application filed July 11, 1931. Serial No. 550,200.

This invention relates to timing mechanisms and has for its object a particularly simple and accurate timing mechanism for producing the alternate actuation of any mechanisms that are to be alternately and intermittently operated.

The invention consists in the novel features and in the combinations and constructions hereinafter set forth and claimed.

In describing this invention, reference is had to the accompanying drawings in which like characters designate corresponding parts in all the views.

Figure 1 is an elevation, partly in section, of this timing mechanism.

Figure 2 is an enlarged sectional view taken on line 2—2, Figure 1.

Figure 3 is a view looking upwardly in Figure 1.

Figure 4 is an exploded view, partly in section, of the parts seen in Figure 1.

This timing mechanism comprises, generally, a constantly running timer member formed with timing cams and mounted on a stationary hub, clutches for connecting and disconnecting the driven elements to be timed, and driving elements, shift rods guided in the hub and connected to the clutches respectively and having followers coacting with the cams, the cams being preferably internal cam grooves formed in the hub of the timing member and opening toward the periphery of the stationary hub and the shift rods extend parallel to the axis of the timer member and guided into passages in the stationary hub and have followers or rollers in the cam grooves respectively.

1 and 2 are respectively driven elements to be timed, these being connected by suitable motion transmitting means to the mechanism of the machine to be alternately and intermittently actuated. These are here shown as sprocket wheels, 3 and 4 are driving elements for actuating the driven elements 1, 2, these being constantly rotating and both connected to a prime mover. As here illustrated, the driving and driven elements are mounted on a stationary shaft 5 suitably supported in a frame 6. The driven and driving elements 1 and 3 are mounted on the shaft 5 in the same manner as the driven and driving elements 2, 4, and in Figure 2, the driven and driving elements 2, 4 and the manner in which they are mounted on the shaft 5 is illustrated. The driven and driving elements 1, 3 are mounted in the same manner as shown in Figure 2.

As seen in Figure 2, the driven element 2 is mounted upon and keyed to a sleeve 7 rotatably mounted on the shaft 5 and the driving element 4 which is shown as a spur gear is mounted to rotate about the sleeve 7. The sleeve is connectible to and disconnectible from the driving member 1 by suitable clutch means as an axially shiftable clutch section 8 keyed to the sleeve 7 at 9 and shiftable axially thereof, this having a clutch face 10 on one side thereof for coacting with a complemental clutch face 11 on the hub of the driving gear or element 4 and also having a clutch face 12 on the other side thereof for coacting with the complemental clutch face on a fixed part as on the frame 6.

16 designates a clutch section similar to the clutch section 8 for connecting and disconnecting the driven element or sprocket wheel 1 and the driving element or gear 3, the clutch section 16 being the same as the clutch section 8.

The clutches are shifted and their operation timed by means of a timer member 20 connected to the prime mover to be constantly actuated thereby, this being here shown as a gear wheel rotatably mounted on a stationary hub 21 on the shaft 5, the wheel 20 being formed with a pair of cams, and shift rods 22, 23 coacting respectively with the cams and connected respectively to the clutches 16 and 8, these shift rods being guided in the frame and in the stationary hub 21 and having followers coacting with the cams of the wheel 20. Preferably, the cams are internal grooves 26, 27 formed in the hub 28 of the wheel 20 with their open sides presented toward the periphery of the stationary hub 21 and the followers are rollers 30 mounted on the rods 22, 23 and coacting respectively with the cams. The rods are guided in suitable passages 31 in the stationary hub 21. The rods 22, 23 are connected to the clutch sections in any suitable manner as by forks or yokes 32. The prime mover may be any suitable drive shaft. It is usually a shaft actuated by an electric motor. Each rod is connected to both clutches but one rod has its follower in one cam groove and the other rod has its follower in the other cam groove. Owing to this arrangement of the two followers, working in their own grooves, the shifting of the clutch sections is more positive and accurate than when one follower and cam is used or where a spring is relied on to cause a follower to follow a cam.

36 is the drive shaft connected to the rotor of the electric motor or any other motor means and having a pinion 37 at its end meshing with opposing bevelled gears 38, 39 mounted on aligned shaft sections 40, 41, the shaft section 40 having a gear 42 thereon meshing with the driving element or gear 3 and the shaft section 41 having a similar gear 43 thereon meshing with the gear 4. The shaft section also has a gear 45 thereon, which meshes with the timer gear 20. The shaft sections 40 and 41 are thus constantly actuated and in this embodiment of the invention in opposite directions because of pinion 61 interposed between the bevel gears 62, 72.

In operation, the driving gears 3, 4 and also the timer gear 20 are constantly rotated, and during the rotation of the gear 20, when the rods 22 are shifted to clutch the clutch section 16 to the gear 3, the clutch section 8 is shifted out of engagement with the gear 4 and into engagement with the frame in order to instantly stop the driven element 2 and the mechanism actuated thereby, after the wheel 3 has been actuated a predetermined period determined by the lay-out of the cams, the clutch section 16 is shifted out of engagement with the driving gear 3 and into engagement with the frame 6 to instantly stop the driven member 1 and the mechanism actuated thereby, while the clutch section 8 is shifted into engagement with the driving element 4.

This timer mechanism is particularly advantageous in that it is accurate and positive in operation and cannot get out of order, and also is particularly strong and economical in construction. The internal cam grooves are particularly advantageous in that they insure absolutely accuracy and function with accuracy where other forms of cams, as external grooves or cams wherein the followers are held against them by springs are unsatisfactory for accurate timing.

What I claim is:

1. In a timer mechanism, the combination of driven elements to be actuated with respect to each other, a constantly running driving element for each of the driven elements, a clutch for connecting and disconnecting each driving and driven element, a prime mover for actuating the driving elements and means for timing and operating the clutches including a constantly driven timing member connected to the prime mover, cams operated thereby and connections between the cams and the clutch means, said clutches being connected respectively to the driven elements and shiftable into and out of engagement with the driving elements and means fixed relatively to the clutches for engaging the same when they are shifted out of clutching position to positively stop the driven elements.

2. In a timer mechanism, the combination of a suitable frame, a stationary shaft mounted in the frame, pairs of driving and driven elements mounted concentric with the shaft to rotate about the same, clutches slidable axially of the shaft for connecting and disconnecting each driving and driven element, one clutch for each pair, a prime mover and motion transmitting means between the prime mover and the driving elements, a stationary hub mounted on said shaft between the pairs of driving and driven elements, a timer member rotatable about the hub and connected to the prime mover, the timer member being formed with a pair of cams, shifter rods having followers coacting with the cams, said rods being guided in the stationary hub and being connected to the clutches respectively.

3. In a timer mechanism, the combination of a suitable frame, a stationary shaft mounted in the frame, pairs of driving and driven elements mounted concentric with the shaft to rotate about the same, clutches slidable axially of the shaft for connecting and disconnecting each driving and driven element, one clutch for each pair, a prime mover and motion transmitting means between the prime mover and the driving elements, a stationary hub mounted on said shaft between the pairs of driving and driven elements, a timer member rotatable about the hub and connected to the prime mover, the timer member being formed with a pair of cams, shifter rods having followers coacting with the cams respectively, said rods being guided in the stationary hub and being connected to the clutches respectively, said cams being internal grooves formed in the timer member.

4. In a timber mechanism, the combination of clutches, a stationary hub, a constantly running timer member mounted to rotate about the hub and formed with juxtaposed cams, shift rods connected respectively to the clutches and guided in said hub and having followers coacting with the cams.

5. In a timer mechanism, the combination of clutches, a stationary hub, a constantly running timer member mounted to rotate about the hub and formed with juxtaposed cams, shift rods connected respectively to the clutches and guided in said hub and having followers coacting with the cams, the cams being internal grooves opening toward the periphery of the hub.

In testimony whereof, I have hereunto signed my name, at Syracuse, in the county of Onondaga and State of New York, this 3rd day of July, 1931.

EDWARD C. BIXBY.